United States Patent [19]
Angelo et al.

[11] Patent Number: 5,986,851
[45] Date of Patent: Nov. 16, 1999

[54] SELECTIVE CARBON OVERCOAT OF THE TRAILING EDGE OF MR SLIDERS

[75] Inventors: James E. Angelo, Falcon Heights; Terry W. Schar, Lakeville, both of Minn.

[73] Assignee: Seagate Technology, Inc., Scotts Valley, Calif.

[21] Appl. No.: 08/984,381

[22] Filed: Dec. 3, 1997

Related U.S. Application Data

[60] Provisional application No. 60/055,893, Aug. 15, 1997.

[51] Int. Cl.$^6$ ............................... G11B 5/60; G11B 15/64
[52] U.S. Cl. ............................................................ 360/103
[58] Field of Search ................................... 360/102–103, 360/126

[56] References Cited

U.S. PATENT DOCUMENTS

| | | | |
|---|---|---|---|
| 5,023,738 | 6/1991 | Prenosil | 360/122 |
| 5,159,508 | 10/1992 | Grill et al. | 360/103 |
| 5,198,934 | 3/1993 | Kubo et al. | 360/104 |
| 5,296,982 | 3/1994 | Terada et al. | 360/103 |
| 5,336,550 | 8/1994 | Ganapathi et al. | 428/216 |
| 5,384,195 | 1/1995 | Bachmann et al. | 428/408 |
| 5,443,888 | 8/1995 | Murai et al. | 428/143 |
| 5,473,486 | 12/1995 | Nepela et al. | 360/103 |
| 5,566,038 | 10/1996 | Keel et al. | 360/103 |

FOREIGN PATENT DOCUMENTS

| | | |
|---|---|---|
| 57-111827 | 7/1982 | Japan . |
| 57-183623 | 11/1982 | Japan . |
| 61-122915 | 6/1986 | Japan . |
| 61-206917 | 9/1986 | Japan . |
| 63-64684 | 3/1988 | Japan . |
| 63-091815 | 4/1988 | Japan . |
| 63-117379 | 5/1988 | Japan . |
| 2-239420 | 9/1990 | Japan . |
| 3-214478 | 9/1991 | Japan . |
| 5-028429 | 2/1993 | Japan . |
| 5-46940 | 2/1993 | Japan . |
| 5-182140 | 7/1993 | Japan . |
| 6-12615 | 1/1994 | Japan . |
| 6-119628 | 4/1994 | Japan . |
| 8-297813 | 11/1996 | Japan . |

*Primary Examiner*—George J. Letscher
*Attorney, Agent, or Firm*—Westman, Champlin & Kelly, P.A.

[57] ABSTRACT

A data head is provided which includes a slider having a transducer formed in a thin film structure at a trailing edge end of the slider. The data head also includes transducer overcoat protection which protects the transducer without increasing a spacing between the transducer and a surface of a data storage disc for a given fly height of the data head above the surface of the data storage disc. In addition, a method of fabricating the data head is disclosed.

6 Claims, 6 Drawing Sheets

SELECTIVE CARBON OVERCOAT OF THE TRAILING EDGE OF MR SLIDERS

The present application claims the benefit of earlier filed U.S. Provisional Application No. 60/055,893, abandon entitled SELECTIVE CARBON OVERCOAT OF THE TRAILING EDGE OF MR SLIDERS, filed on Aug. 15, 1997.

FIELD OF THE INVENTION

The present invention relates generally to data storage systems. More particularly, the present invention relates to a head slider having a selective carbon overcoat of the magnetoresistive (MR) and/or inductive thin film structure formed on the trailing edge of the slider body substrate.

BACKGROUND OF THE INVENTION

In disc drives, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. When the transducer is an MR type sensor, the combination of the slider and the transducer are frequently referred to as an MR head. The heads are selectively moved under the control of electronic circuitry to any one of a plurality of circular, concentric data tracks on the disc surface by an actuator device. As the disc rotates, the heads "fly" several microinches above the surface disc.

Currently, head sliders frequently include a diamond-like carbon (DLC) overcoat of the air bearing surface (ABS). This overcoat serves several functions, including: providing for improved contact start-stop (CSS) durability; protecting the read/write transducer element(s) from incidental contact with the disc surface; and preventing corrosion of the read/write transducer element(s). However, the DLC overcoat in existing head slider designs requires that tradeoffs be made which can adversely effect the performance of the head. Generally, DLC overcoats in existing designs have resulted in an increase in the spacing between the transducer element pole tips and the disc surface for a given fly height of the head slider. In the alternative, to maintain the same magnetic spacing of the transducer element pole tips from the disc surface in a DLC coated head slider as compared to a non-coated head slider, the fly height of the DLC coated head slider must be reduced. Avoiding this problem by eliminating the DLC coating could result in damage to the read/write transducer element from incidental contact or corrosion.

The present invention provides a solution to this and other problems, and offers other advantages over the prior art.

SUMMARY OF THE INVENTION

The present invention relates to data heads or head sliders for use in data storage systems such as magneto-optical and magnetic disc drive data storage systems.

In accordance with one embodiment of the invention, a data head is provided which includes a slider having a transducer formed in a thin film structure at a trailing edge end of the slider. The data head also includes a transducer overcoat layer which protects the transducer without increasing a spacing between the transducer and a surface of a data storage disc for a given fly height of the data head above the surface of the data storage disc. In addition, a method of fabricating the data head is disclosed.

These and various other features as well as advantages which characterize the present invention will be apparent upon reading of the following detailed description and review of the associated drawings.

DETAILED DESCRIPTION OF THE PREFERRED EMBODIMENTS

Figure 1:
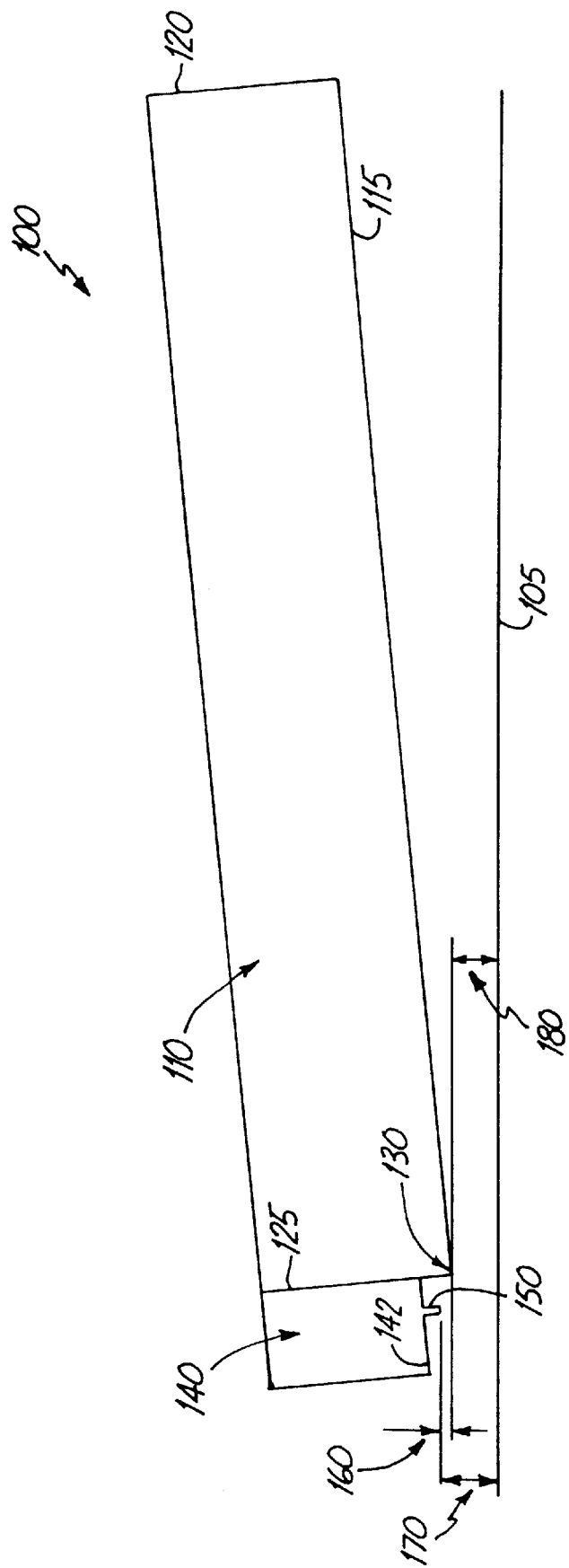
FIG. 1 is a diagrammatic illustration of a prior art head slider without a diamond-like carbon (DLC) overcoat.

Referring now to FIG. 1, prior art head slider 100 is shown. A typical head slider, like head slider 100 shown in FIG. 1, includes slider body substrate 110 having an air bearing surface (ABS) 115 and leading and trailing edges 120 and 125. On trailing edge end or surface 125, thin film structure 140 is typically formed on slider body substrate 110 using known fabrication techniques.

Thin film structure 140 typically includes various thin film layers, including those used to form a read and/or write transducer element such as element 150. Surface 142 of thin film structure 140 is recessed from ABS 115 of slider body substrate 110 in order to protect read/write transducer element 150. However, surface 142 of thin film structure 140 is generally considered to be part of the ABS of head slider 100.

Because surface 142 is recessed relative to surface 115, corner 130 of slider body substrate 110 is typically the point of minimum spacing between head slider 100 and disc surface 105. With the pole tips of transducer element 150 being recessed relative to point 130 by a pole tip recession (PTR) distance 160, the magnetic spacing distance 170 between the pole tips of element 150 and surface 105 will be greater than the fly height $h_{FLY}$ 180 of head slider 100 above disc surface 105 as measured between point 130 and the disc surface. Prior art head sliders such as head slider 100 frequently suffer damage to transducer element 150 caused by either corrosion or contact with the disc surface.

Figure 2:
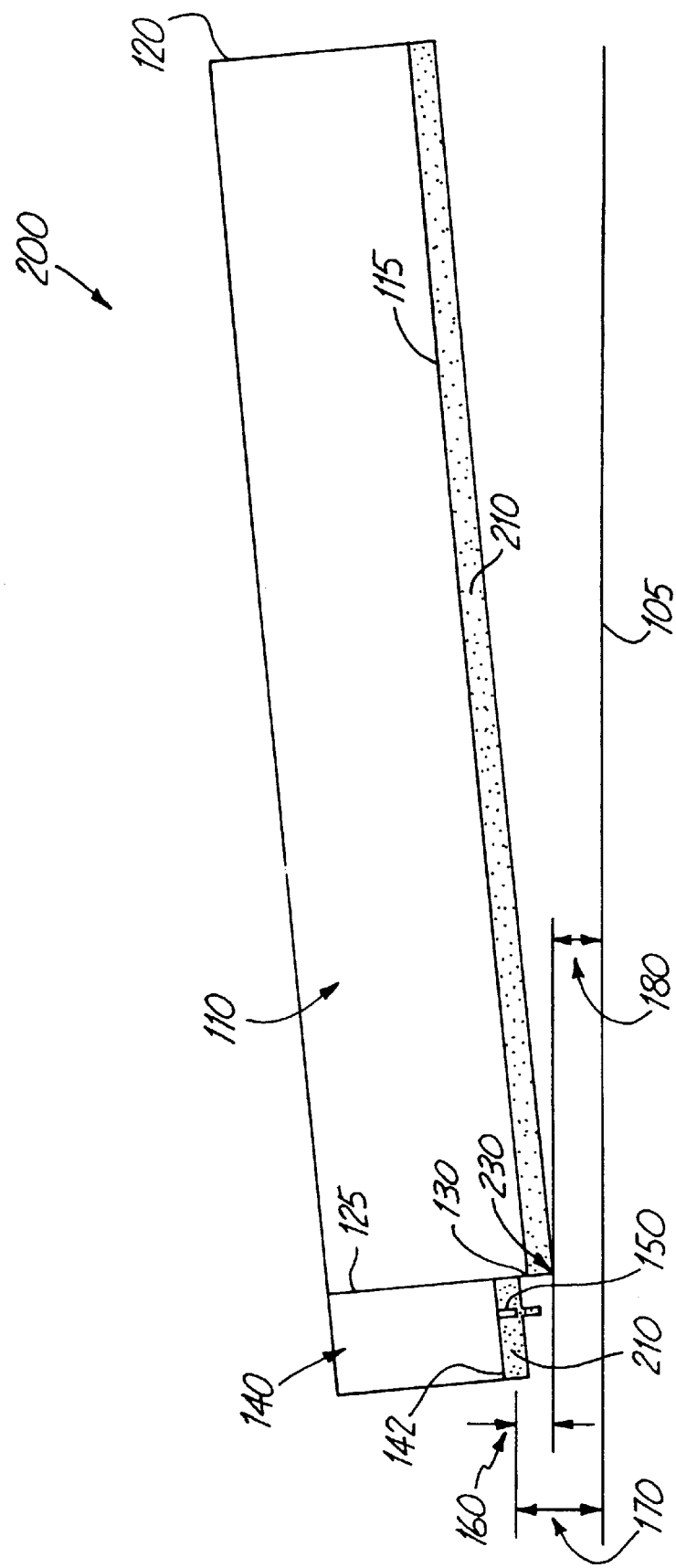
FIG. 2 is a diagrammatic illustration of a prior art head slider having a DLC overcoat on the air bearing surface (ABS) of the slider body substrate and on the ABS of the thin film structure at the trailing edge of the slider body substrate.

FIG. 2 is a diagrammatic illustration of prior art head slider 200. Head slider 200 is identical to head slider 100 illustrated in FIG. 1, with the exception of diamond-like carbon (DLC) coating 210 on ABS 115 of slider body substrate 110 and on surface 142 of thin film structure 140. The addition of DLC coating 210 protects ABS 115 and transducer element 150 from corrosion. Also, the portion of DLC coating 210 covering transducer element 150 protects the element from damage caused by contact with disc surface 105.

Because of DLC coating 210, point 130 of slider body substrate 110 is no longer the point of minimum spacing between the head slider and disc surface 105. Instead, point 230 formed by DLC coating 210 adjacent point 130 becomes the point of minimum separation, and therefore defines the fly height $h_{FLY}$ 180 of slider 200. Likewise, the PTR distance or separation 160 between the pole tips of transducer element 150 and point 230 will be increased correspondingly. Since the magnetic spacing 170 between transducer element 150 and disc surface 105 can be defined as the sum of the fly height $h_{FLY}$ 180 and the PTR distance 160, inclusion of DLC coating 210 increases the magnetic spacing for a given fly height as compared to a non-coated head slider such as the one illustrated in FIG. 1. Stated conversely, to maintain the same magnetic spacing 170 as compared to a non-coated head slider, inclusion of the DLC coating requires a reduction in fly height $h_{FLY}$ 180.

Figure 3:
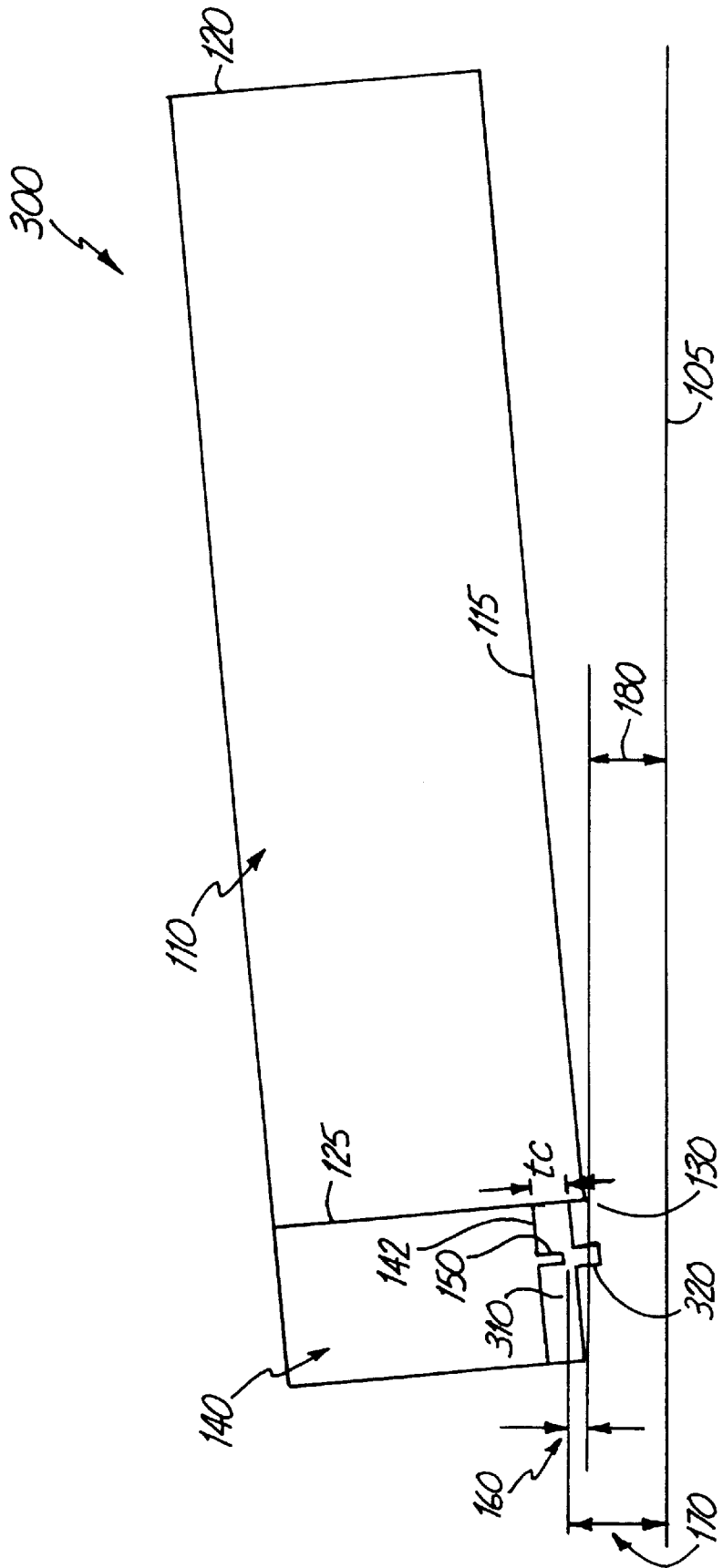
FIG. 3 is a diagrammatic illustration of a head slider, according to the present invention, having a DLC coating only on the portion of the ABS corresponding to the thin film structure at the trailing edge end of the slider body substrate.

FIG. 3 is a diagrammatic illustration of head slider 300 in accordance with preferred embodiments of the present invention. Head slider 300 is substantially identical to head slider 100 illustrated in FIG. 1 with the exception of DLC coating 310 covering surface 142 of thin film structure 140. While head slider 300 does include DLC coating 310 on the portion of the ABS corresponding to thin film structure 140, head slider 300 differs from head slider 200 illustrated in FIG. 2 in that it does not include a DLC coating on ABS 115 of slider body substrate 110.

By providing DLC coating 310 over surface 142 of thin film structure 140, transducer element 150 is protected from damage due to corrosion and/or contact with disc surface 105. DLC coating 310 will typically have a thickness $t_c$ of approximately 100 Å or less. Preferably, thickness $t_c$ will be less than the recession distance between point 130 and surface 142. Further, the thickness $t_c$ of DLC 310 is preferably such that point 130 will continue to be the point of minimum spacing between head slider 300 and the surface of disc 105 at the desired pitch angle of the head slider. Although DLC 310 may initially form point 320 under the pole tips of transducer 150, and although point 320 may initially be closer to disc surface 105 than is point 130, wear between point 320 and disc surface 105 will preferably result in point 130 being at least as close to disc surface 105 as any other point of head slider 300 during flight.

An advantage of the design of head slider 300 over the prior art is that, for a given fly height $h_{FLY}$ 180, the magnetic spacing 170 between read/write transducer 150 and disc surface 105 is substantially unaffected by the presence of DLC coating 310. Alternately stated, for a desired magnetic spacing, omitting the DLC coating on ABS 115 of slider body substrate 110 allows the fly height to be maximized. At the same time, DLC coating 310 protects read/write transducer 150.

Figure 4:
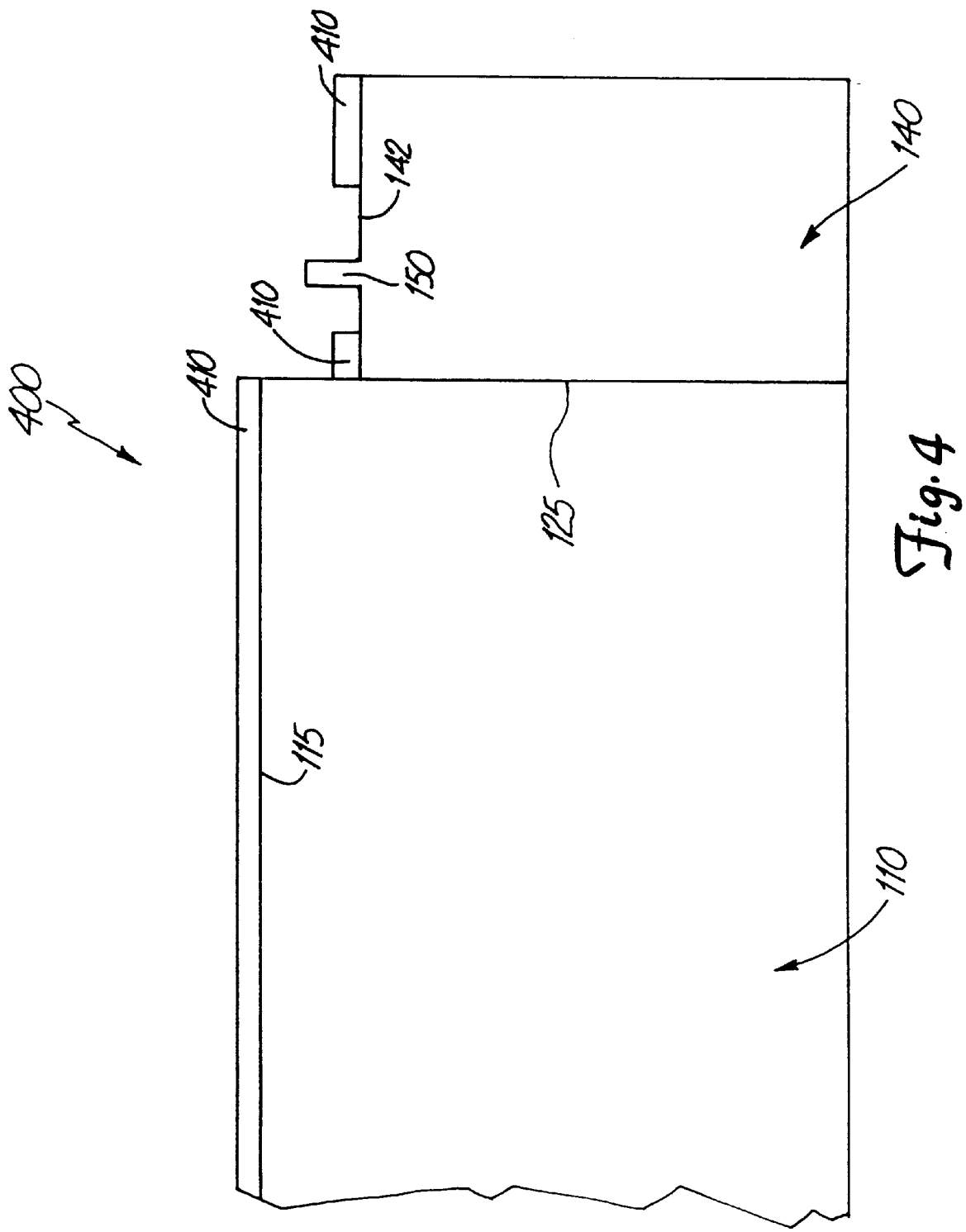
FIGS. 4–6 are diagrammatic illustrations of various steps in a method of fabricating a head slider in accordance with embodiments of the present invention.
Figure 5:
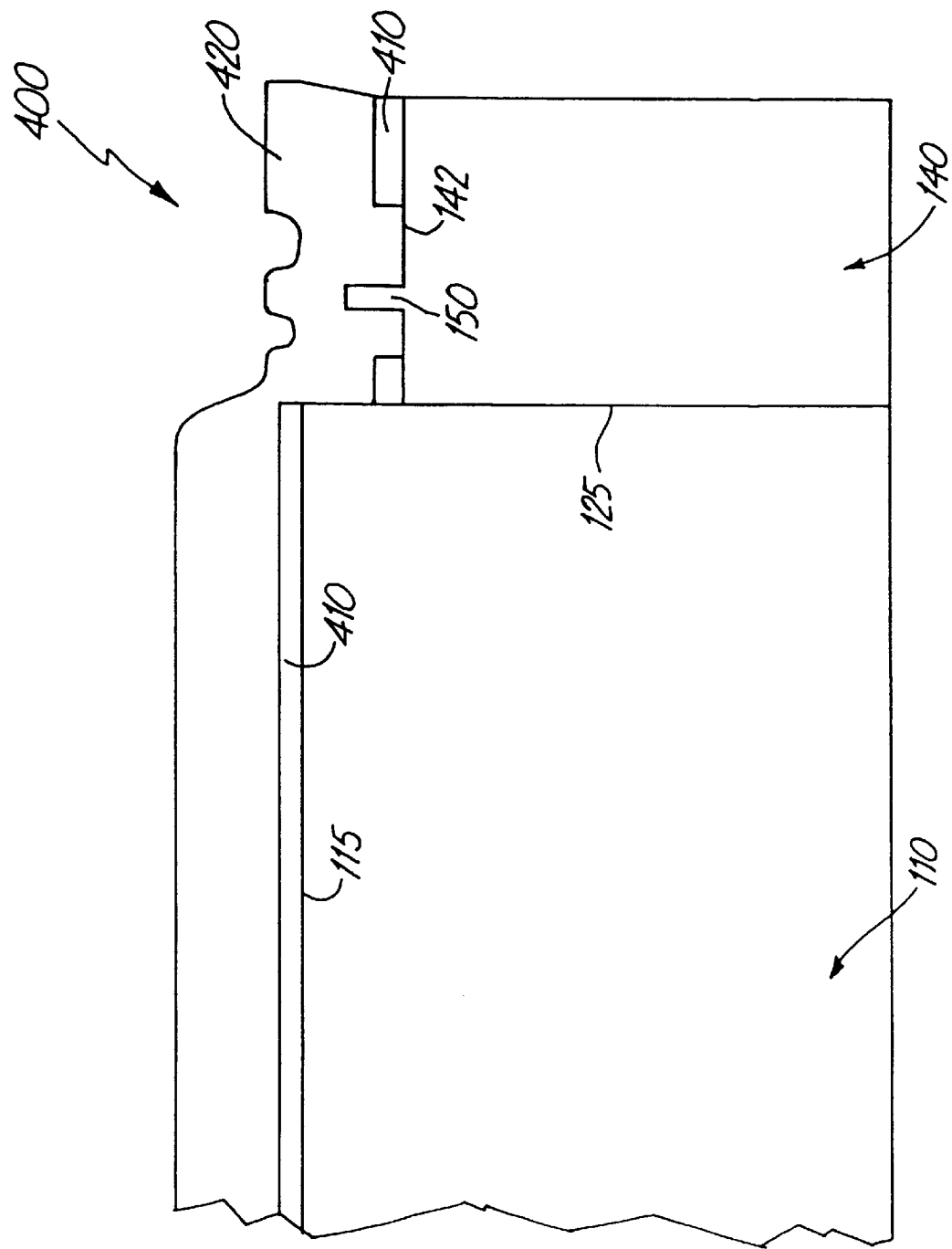
Figure 6:
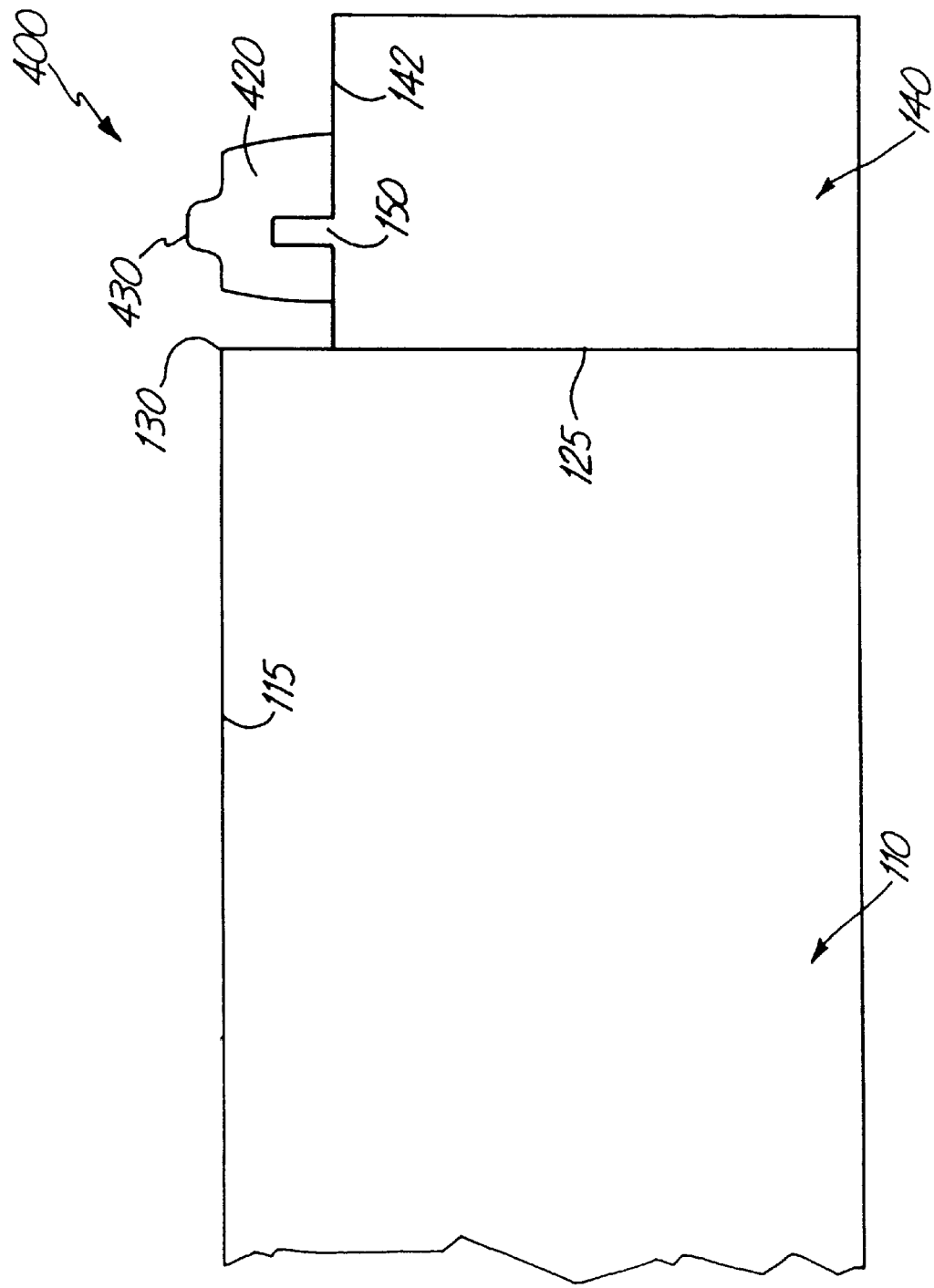

FIGS. 4–6 illustrate various steps in a method of fabricating a head slider in accordance with preferred embodiments of the present invention. As illustrated in FIG. 4, head slider 400 includes slider body substrate 110 having ABS 115 and trailing edge 125. At trailing edge 125, thin film structure 140 has been built-up or formed using a variety of known thin film structure fabrication techniques. Thin film structure 140 includes read and/or write transducer 150 at surface 142 which forms a portion of the ABS of head slider 400.

To form a protective DLC coating on thin film structure 140, layer 410 of photoresist is placed on portions of surface 142, and if desired on portions of ABS 115, which are not to be coated with DLC. As shown in FIG. 4, photoresist 140 is applied to portions of surface 142 which are not immediately adjacent to the location of transducer 150. However, to fabricate head slider 300 as illustrated in FIG. 3, none of surface 142 would have photoresist applied. An alternate technique of forming the protective DLC coating of the present invention is to use a mask with ion beam deposition or sputter deposition.

Next, as illustrated in FIG. 5, DLC coating 420 is applied on top of photoresist 410 and on top of portions of surface 142 not covered by photoresist. Generally, the thickness of DLC overcoat layer 420 will be about 100 Å or less. Finally, as illustrated in FIG. 6, photoresist 410 is removed, for example with a lift-off process, leaving DLC 420 only on portions of surface 142 which were not covered with photoresist 410. As can be seen in FIG. 6, it is not necessary that all of surface 142 be covered with DLC coating 420. With wear from use of head slider 400, bump 430 in DLC coating 420, which corresponds to the location of the pole tips of transducer element 150, will wear down leaving point 130 as a closest point to the surface of the disc during operation.

The present invention can be summarized in reference to FIG. 3 which is a diagrammatic side view of the preferred embodiment data head or head slider 300. Data head 300 includes a slider 110 having a transducer 150 formed in a thin film structure 140 at a trailing edge end 125 of the slider. Slider 110 is adapted to fly above a surface 105 of a data storage disc. A transducer overcoat layer 310 protects the transducer without increasing a spacing 170 between the transducer and the surface 105 of the data storage disc for a given fly height 180 of the data head above the surface of the data storage disc.

In some embodiments, slider body substrate 110 of data head or head slider 300 includes a leading edge end 120 and a trailing edge end 125. The slider body substrate 110 also has a first slider body surface 115 which forms a first portion of an air bearing surface of the head slider extending between the leading and trailing edge ends 120 and 125.

Magnetic transducer 150 is included in thin film structure 140 formed on the trailing edge end 125 of the slider body substrate 110. Thin film structure 140 has a first thin film structure surface 142 which forms a second portion of the air bearing surface of the head slider. Protective layer 310 formed on the thin film structure covers at least some of the second portion 142 of the air bearing surface, but does not cover the first portion 115 of the air bearing surface. The protective layer 310 is preferably a DLC layer. Preferably, second portion 142 of the air bearing surface is recessed by a first distance relative to a first point 130 on the first portion 115 of the air bearing surface. The first point 130 is a point on the first portion 115 of the air bearing surface which flies closest to the surface 105 of the data storage disc. Preferably, the first point 130 is not covered with the carbon overcoat layer. With the carbon overcoat layer having a thickness which is less than the first distance such that the carbon overcoat layer 310 remains farther from the surface of the data storage disc than does the first point on the first portion of the air bearing surface. In this way, carbon overcoat layer 310 protects the magnetic transducer without increasing a spacing 170 between the magnetic transducer and the surface of the data storage disc for a given fly height 180 of the head slider above the surface of the data storage disc.

In a method of fabrication, as illustrated in FIGS. 4–6, a head slider 400 is provided which has a slider body substrate 110 which includes a leading edge end and a trailing edge end, the slider body substrate also includes a first slider body surface 115 which forms a first portion of the air bearing surface of the data head. The head slider also has thin film structure 140 formed on the trailing edge end 125 of the slider body substrate. The thin film structure has a magnetic transducer 150 formed therein. The thin film structure has a first thin film structure surface 142 which forms a second portion of the air bearing surface of the data head. A protective layer 420 is formed on the thin film structure covering at least some of the second portion 142 of the air bearing surface, and not covering the first portion 115 of the air bearing surface.

In the method, forming the protective layer 420 further includes defining a photomask 410 on the air bearing surface to thereby designate where on the second portion 142 of the air bearing surface the protective or carbon overcoat layer 420 is to be formed. The carbon overcoat layer 420 is deposited on the photomask 410 and on the designated portions of the air bearing surface not covered by the photomask. The photomask 410 is removed to remove the carbon overcoat layer 420 from non-designated portions of the air bearing surface.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the head sliders while maintaining substantially the same functionality without departing from the scope and spirit of the present invention.

What is claimed is:

1. A data head comprising:

a slider having a slider body providing a first portion of an air bearing surface of the data head and having a transducer formed in a thin film structure at a trailing edge end of the slider, the thin film structure forming a second portion of the air bearing surface of the data head, the second portion of the air bearing surface being recessed relative to the first portion of the air bearing surface such that a point on the first portion of the air bearing surface is adapted to fly closest to a data storage disc during flight of the data head; and transducer overcoat protection means for protecting the transducer at the second portion of the air bearing surface without increasing a spacing between the transducer and the surface of the data storage disc for a given fly height of the data head above the surface of the data storage disc.

2. A head slider adapted to fly above a surface of a data storage disc, the head slider comprising:

a slider body substrate having a leading edge end and a trailing edge end, the slider body substrate also having a first slider body surface which forms a first portion of an air bearing surface of the head slider, the first portion of the air bearing surface of the head slider extending between the leading and trailing edge ends of the slider body substrate, the first portion of the air bearing surface and the trailing edge end of the slider body substrate forming a first point adapted to fly closest to the surface of the data storage disc;

a thin film structure formed on the trailing edge end of the slider body substrate, the thin film structure having a magnetic transducer formed therein and providing a first thin film structure surface which is recessed by a first distance relative to the first point at a position of the first thin film structure surface which is in contact with the trailing edge end of the slider body substrate, the first thin film structure surface forming a second portion of the air bearing surface of the head slider; and a protective layer formed on the thin film structure covering at least some of the second portion of the air bearing surface, and not covering the first portion of the air bearing surface, the protective layer having a thickness which is less than the first distance.

3. The head slider of claim 2, wherein the protective layer is a carbon overcoat layer.

4. The head slider of claim 3, wherein the carbon overcoat layer is formed on the thin film structure such that it covers the magnetic transducer and thereby protects the magnetic transducer.

5. The head slider of claim 4, wherein the carbon overcoat layer is formed such that it protects the magnetic transducer from corrosion.

6. The head slider of claim 4, wherein the carbon overcoat layer is formed such that it protects the magnetic transducer from damage caused by collision of the thin film structure with the surface of the data storage disc.

* * * * *